US006421761B1

(12) United States Patent
Arimilli et al.

(10) Patent No.: US 6,421,761 B1
(45) Date of Patent: Jul. 16, 2002

(54) PARTITIONED CACHE AND MANAGEMENT METHOD FOR SELECTIVELY CACHING DATA BY TYPE

(75) Inventors: Ravi Kumar Arimilli; Bryan Ronald Hunt; William John Starke, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,950

(22) Filed: Nov. 9, 1999

(51) Int. Cl.$^7$ ............................................... G06F 12/00
(52) U.S. Cl. ..................... 711/128; 711/129; 711/202; 711/203; 711/130
(58) Field of Search ................. 711/129, 128, 711/202, 203, 173, 206, 153, 130

(56) References Cited

U.S. PATENT DOCUMENTS

| | | | |
|---|---|---|---|
| 4,441,155 A | | 4/1984 | Fletcher et al. |
| 4,503,501 A | * | 3/1985 | Coulson ...................... 711/129 |
| 4,905,141 A | * | 2/1990 | Brenza ........................ 711/129 |
| 5,148,538 A | * | 9/1992 | Celtruda ..................... 711/205 |
| 5,606,689 A | * | 2/1997 | McNutt ....................... 711/170 |
| 5,717,893 A | * | 2/1998 | Mattson ...................... 711/129 |
| 5,875,464 A | * | 2/1999 | Kirk ........................... 711/129 |
| 5,909,694 A | * | 6/1999 | Gregor ........................ 711/128 |
| 5,915,262 A | | 6/1999 | Bridgers et al. |
| 6,014,728 A | | 1/2000 | Baror |
| 6,032,227 A | | 2/2000 | Shaheen et al. |
| 6,044,478 A | | 3/2000 | Green |
| 6,047,358 A | | 4/2000 | Jacobs |
| 6,223,256 B1 | * | 4/2001 | Gaither ....................... 711/134 |
| 6,260,114 B1 | * | 7/2001 | Schug ......................... 711/129 |
| 6,272,598 B1 | | 8/2001 | Arlitt et al. |

OTHER PUBLICATIONS

Attorney Docket No. AT9–98–832 application No. 09/390,186, Related Co–Pending Application Arimilli et al. filed on Sep. 7, 1999.

\* cited by examiner

*Primary Examiner*—Do Hyun Yoo
*Assistant Examiner*—Kimberly N. McLean
(74) *Attorney, Agent, or Firm*—Volel Emile; Bracewell & Patterson, L.L.P.

(57) ABSTRACT

A partitioned cache and management method for selectively caching data by type improves the efficiency of a cache memory by partitioning congruence class sets for storage of particular data types such as operating system routines and data used by those routines. By placing values for associated applications into different partitions in the cache, values can be kept simultaneously available in cache with no interference that would cause deallocation of some values in favor of newly loaded values. Additionally, placing data from unrelated applications in the same partition can be performed to allow the cache to rollover values that are not needed simultaneously.

18 Claims, 4 Drawing Sheets

PARTITIONED CACHE AND MANAGEMENT METHOD FOR SELECTIVELY CACHING DATA BY TYPE

CROSS-REFERENCES TO RELATED APPLICATIONS

The present invention is related to the following application filed concurrently with this application: U.S. patent application Ser. No. 09/435,949 entitled "CACHE AND MANAGEMENT METHOD USING COMBINED SOFTWARE AND HARDWARE CONGRUENCE CLASS SELECTORS" (attorney docket no. AUS990816US1).

The present invention relates to U.S. patent application Ser. No. 09/390,186 entitled "CACHE MANAGEMENT MECHANISM TO ENABLE INFORMATION-TYPE DEPENDANT CACHE POLICIES" (attorney docket no. AT9-98-832) filed Sep. 7,1999 and assigned to the same assignee. The specification is incorporated herein by reference.

BACKGROUND OF THE INVENTION

1. Field of the Invention

The present invention generally relates to computer systems, and more specifically to an agent and method for managing a cache memory in a computer system. In particular, the present invention makes more efficient use of a cache by allocating specific class sets to specific types of program data and instructions.

2. Description of Related Art

The basic structure of a conventional computer system includes one or more processing units connected to various input/output devices for the user interface (such as a display monitor, keyboard and graphical pointing device), a permanent memory device (such as a hard disk, or a floppy diskette) for storing the computer's operating system and user programs, and a temporary memory device (such as random access memory or RAM) that is used by the processor(s) in carrying out program instructions. The evolution of computer processor architectures has transitioned from the now widely-accepted reduced instruction set computing (RISC) configurations, to so-called superscalar computer architectures, wherein multiple and concurrently operable execution units within the processor are integrated through a plurality of registers and control mechanisms.

The objective of superscalar architecture is to employ parallelism to maximize or substantially increase the number of program instructions (or "micro-operations") simultaneously processed by the multiple execution units during each interval of time (processor cycle), while ensuring that the order of instruction execution as defined by the programmer is reflected in the output. For example, the control mechanism must manage dependencies among the data being concurrently processed by the multiple execution units, and the control mechanism must ensure the integrity of data that may be operated on by multiple processes on multiple processors and potentially contained in multiple cache units. It is desirable to satisfy these objectives consistent with the further commercial objectives of increasing processing throughput, minimizing electronic device area and reducing complexity.

Both multiprocessor and uniprocessor systems usually use multi-level cache memories where typically each higher level is smaller and has a shorter access time. The cache accessed by the processor, and typically contained within the processor component of present systems, is typically the smallest cache.

Both operand data and instructions are cached, and data and instruction cache entries are typically loaded before they are needed by operation of prefetch units and branch prediction units. Called "streams", groups of instructions associated with predicted execution paths can be detected and loaded into cache memory before their actual execution. Likewise data patterns can be predicted by stride detection circuitry and loaded before operations requiring the data are executed.

Cache memories are typically organized in a matrix arrangement. One direction in the matrix corresponds to congruence classes and the other, equivalent sets within each congruence class. The congruence class partitioning divides the use of the cache with respect to information type, typically a portion of the address field of a memory location is used to partition the distribution of values from memory across the congruence class sets. In this way, it is only necessary to examine the entries within a given class in order to determine memory conflicts or whether a particular value at a given address is present or absent from the cache.

By dividing the cache into congruence classes, the efficiency of access to the cache is improved, but memory organization within a computer system may not provide for an efficient distribution of reuse patterns in the cache if the typical method of using a portion of a memory address as a class selector is followed. Such a method tends to randomize the association of memory with congruence classes rather than to optimize them. Increasing associativity is one solution, but a fully associative cache, which would be the extreme solution, is not efficient in that a separate tag comparison is required for every entry in the cache when an entry is identified. To do this simultaneously requires a hardware comparator for every entry in the cache. The advantage of a cache with reduced associativity, is that a particular class selector can be used to reduce the number of locations for which a tag must be compared, and thus the number of comparators or comparison cycles required.

As semiconductor processes have improved, processor clock frequencies have generally increased more significantly than the latencies incurred when processors retrieve operand data and instructions from memory have decreased (i.e., decreases in memory access time). As measured in processor clock ticks, these latencies have increased significantly.

Processor architects have addressed this problem by incorporating several levels of cache to retain frequently used data and instructions closer to the processor (from a latency perspective), as well as using techniques to hide or overlap the incurred latencies, e.g., prefetching, speculative execution, out-of-order execution, and multi-threading.

These approaches have achieved varying success in alleviating the negative effects of waiting for retrieval of operand data and instructions from memory (or, in the case of multi-level cache hierarchies, from a more distant level in the hierarchy). Since processor core performance has improved, and a portion of the latency problem has been alleviated, the remaining cache misses have a greatly amplified negative impact on performance. Therefore, current trends strongly indicate an opportunity to improve performance by reducing the number of remaining cache misses.

Also, as semiconductor processes have improved, cache sizes have generally increased more than processor clock frequency. Caches typically retain more of the operand data and instructions used by the processor within a window determined by a number of processor clock ticks. In general, processor architects have implemented cache management methods that rely upon data and instruction usage patterns from the recent past as a predictor of data and instruction usage patterns in the near future. These techniques are based upon the principles of temporal and spatial locality, which state that within a given span of time, there is an increased probability that spatially localized regions of data and instructions will be reused.

While these methods generally improve performance for a wide variety of applications, they produce diminishing returns once a cache is large enough to hold a significant portion of the working set (or footprint) of the instructions and operand data for a given application. In general purpose, time sharing, multi-programmed computer systems, caches contain the working sets of multiple applications, middleware, and operating system code. As caches become larger, more of the operand data and code in these working sets can be retained within the cache. Current cache management methods that favor recently used instructions and operand data, may allow a less valuable "fringe" part of a currently executing working set to displace a highly valuable "core" of a currently dormant working set that will resume execution in the near future.

In light of the foregoing, given the increasing positive impact of cache miss reduction on computer system performance, and given the decreasing returns yielded by presently used cache management methods, it would be desirable to implement a cache method and a cache architecture that will advantageously manage the retention of operand data and instructions within a cache to improve availability and latency.

SUMMARY OF THE INVENTION

It is therefore one object of the present invention to provide an improved cache memory for a computer system.

It is another object of the present invention to provide a computer system using such a cache memory.

It is yet another object of the present invention to provide a computer system and processor that provide more efficient caching of instruction and data values by selectively assigning cache class sets to particular types of instruction and data values.

The foregoing objects are achieved in a method and apparatus for operating a cache memory in a computer system by creating a partition formed by one or more congruence classes and assigning the partition to a particular application type of value. The partitioning can be accomplished by mapping real, physical or virtual memory in such a way as to ensure there are no overlapping data regions associated with the congruence classes, physical memory can be mapped out to prevent wasted stripes created by the partitioning. The partitioning can be used intelligently to cause or prevent roll out of data from the cache by placing associated data in separate partitions to prevent interference or by placing unassociated data within the same partition to allow interference.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE ILLUSTRATIVE EMBODIMENTS

Figure 1:
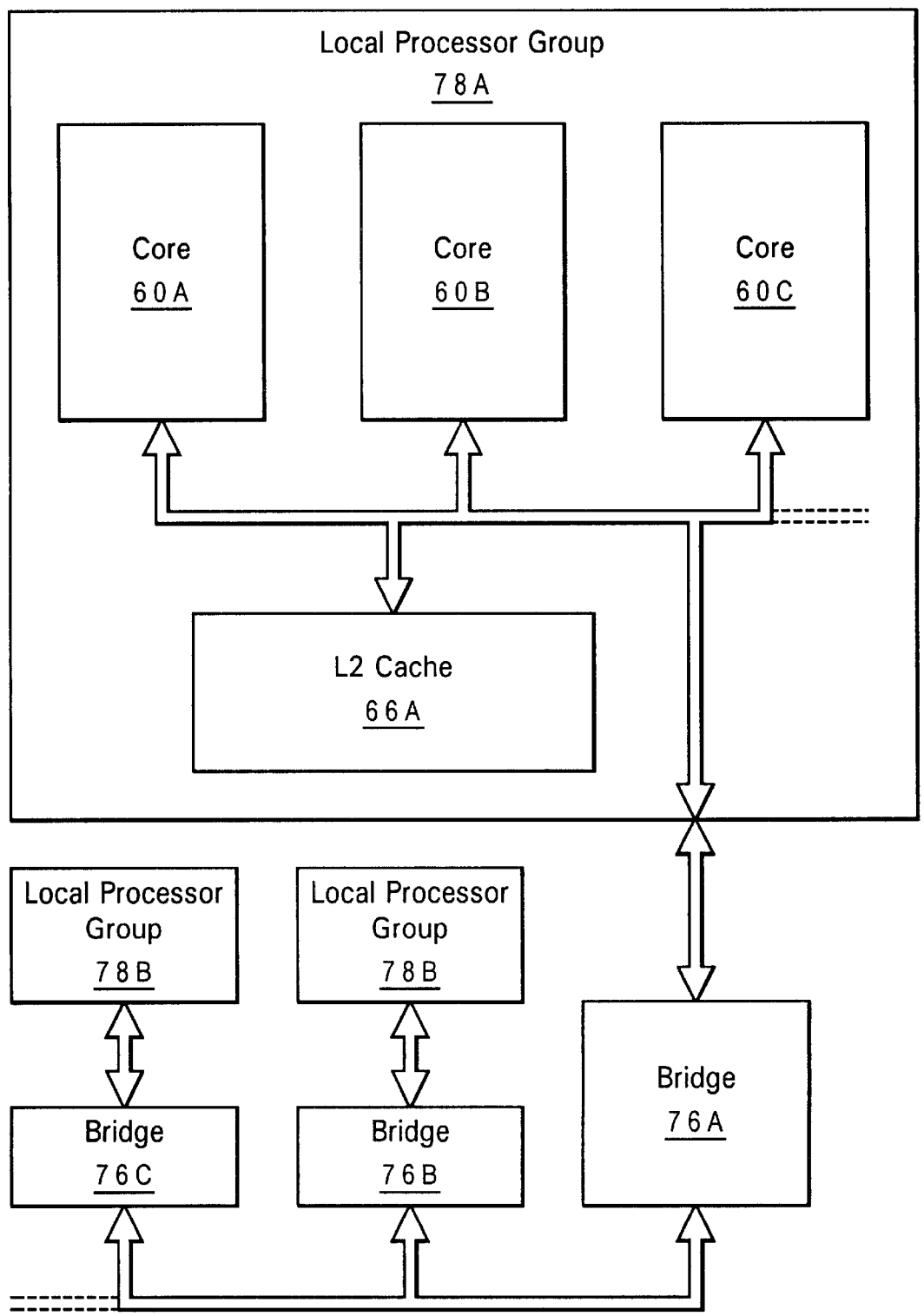
FIG. 1 is an electrical block diagram of a multiprocessor computing system in which the present invention may be practiced, depicting core execution units, system memory, buses and bus bridges.

With reference now to the figures, and in particular with reference to FIG. 1, one embodiment of a multiprocessor computing system is shown in which the present invention can be practiced. The computing system is a connection of local processor groups 78 that perform program operations. This arrangement is particularly useful for general purpose computing for both commercial and scientific/engineering applications. Local processor groups comprise cores 60 that may contain caches or other local storage and the processor groups share a level of L2 cache 66A, that can be accessed by all of the processors in a group, and optionally by other local processing groups through bridges 76.

Figure 2:
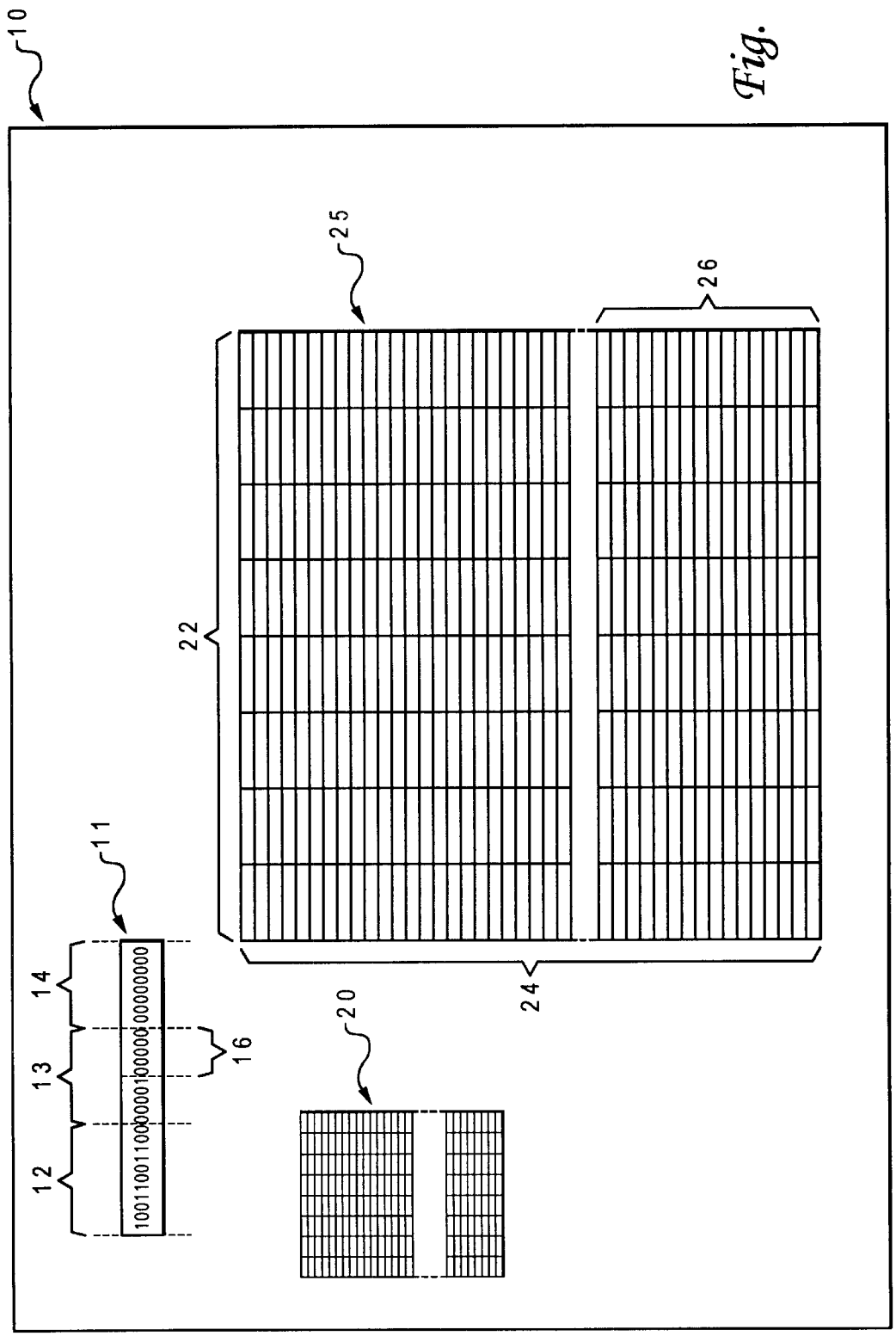
FIG. 2 is a pictoral diagram depicting information in a cache memory in accordance with an embodiment of the present invention.

Referring now to FIG. 2, information elements within cache 10 are depicted. Directory 20 stores information about values stored in information array 25. This information is not limited to, but includes address information and status of the values, including whether a value has been modified since it was loaded into cache 10. The information array consists of congruence classes 24 (depicted as horizontal rows) and associativity sets 22 (depicted as columns). By using an address field 13 from a complete address 11, values can be pigeonholed into particular congruence classes. The lower portion 14 of address 11 is used to select a particular address from the entry in cache 10, in this example 256 values are stored in each cache entry since there are 8 bits in the lower portion of the address. This addressing method produces an assignment of congruence classes 24 that is evenly distributed among addresses, but does not take in to account that particular address ranges may be more frequently needed. The repetitive nature of striping that occurs due to the repeating occurrence of address field 13 for every value of the upper portion 12 of address 11, causes each congruence class to be used for more than one address range in memory, so if two frequently used groups of values are located in regions in memory that map to the same congruence class in cache 10 they may alternatively force the other out of cache 10 while some other values in cache may be accessed much less frequently, but due to their location in memory, they will not be rolled out of cache to advantageously supply storage for one of the two frequently used groups. Therefore, existing systems do not effectively control the relationship of the congruence classes 24, with the partitioning of information in memory.

Sometimes it is advantageous for groups of values to cause other groups of values to be rolled out of cache 10. This is true when the groups of values are from applications that are mutually exclusive. When instructions or data from applications will not be needed at the same time, it would be advantageous to arrange the cache storage so as to have one application value group replace a second application value group.

Another application in which encouraging cache rollout provides an advantage is for data that is only used once. In this extreme example, the cache is actually providing no advantage, since the data will always be rolled out without being reused. If a small region of cache is assigned to allocations for this type of data, the rollout will occur earlier than for random allocations, and this type of data can be prevented from polluting the other regions of cache where reusable values are being stored.

Within the exemplary computer system, three memory address models are used. Physical memory refers to memory locations that are actually populated with storage locations capable of storing values. The physical memory is addressed by the use of logic signals that correspond to a physical address. Real memory corresponds to the entire address space that may be populated by physical memory and encompasses the entire memory space that may be addressed by a processor or other execution unit. The real memory may incorporate address translation, in which case the physical addresses and real addresses might differ for an actual physical memory location, but that is not a critical distinction for understanding the operation of the invention. The real address space is generally larger than the physical address space unless the real address space is fully populated with physical memory storage devices.

Virtual memory is generally an arbitrary address space that is much larger that the real address space. A virtual memory manager maps the pages in real memory to address regions in virtual memory, although in some systems the virtual memory manager may directly map physical addresses to address regions in virtual memory. Generally, virtual pages can be mapped to any real page and multiple virtual pages can be mapped to the same real page.

Figure 3:
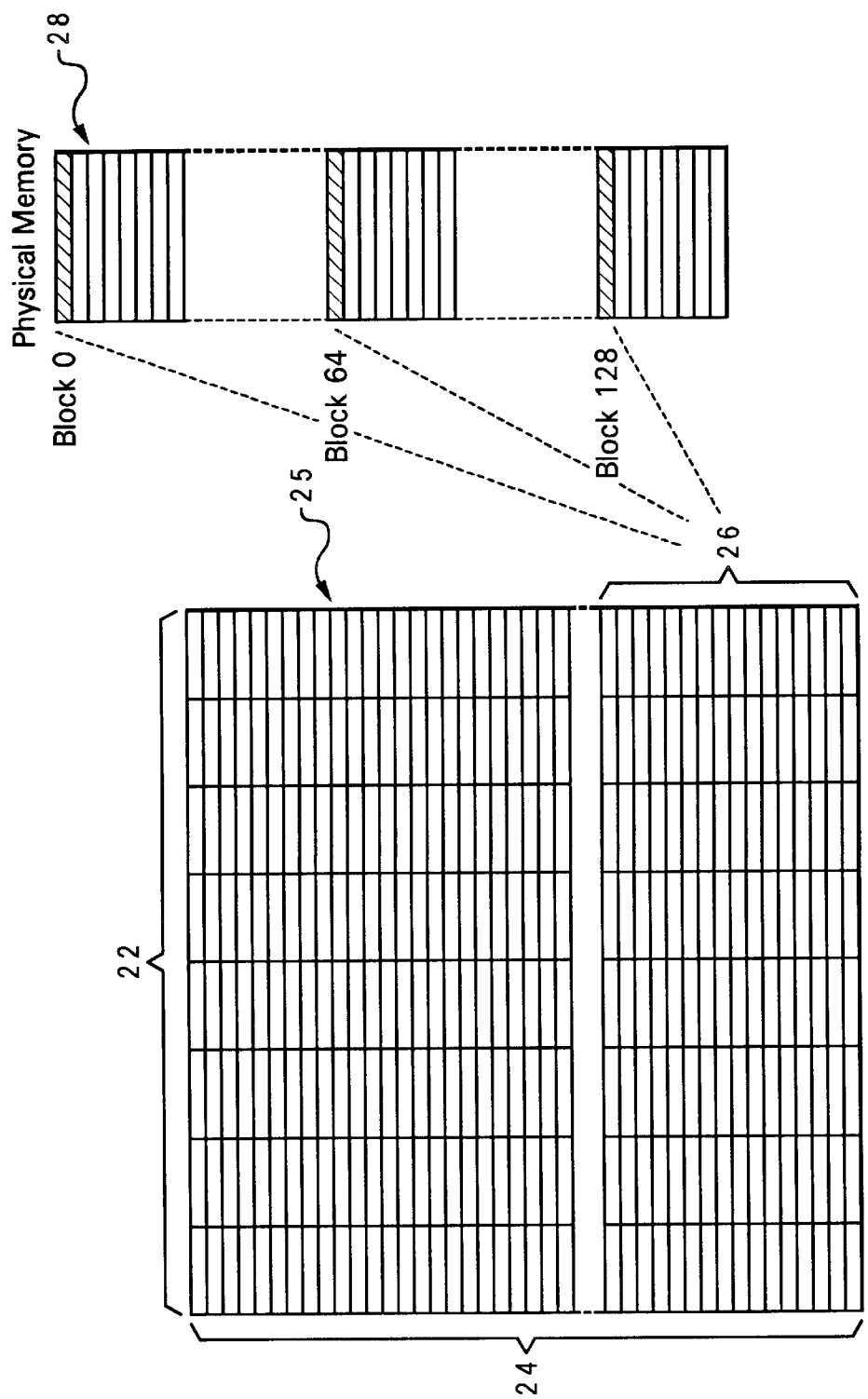
FIG. 3 is a pictoral diagram depicting the relationship between cache data storage and physical memory in accordance with an embodiment of the present invention.

Referring now to FIG. 3, the relationship of the congruence classes and physical memory is depicted. For systems in which a real-to-physical address translation occurs, the mapping shown would correspond to real addresses only, as the physical pages could be in different order. In accordance with the invention, partition 26 is created for storing values associated with a particular application type. The application type of a value in cache is not restricted to "applications" or user programs, but is used herein to mean any type of program instructions or data. For example, the values might be the instructions for a frequently used operating system routine that the system's developer wants to keep pinned in cache. For example, the application type of value may be helper operating systems routines or data used by the operating system, it could be application data or routines run by the operating system, firmware shadow images in memory, video memory or any other code or operand data that is stored in the memory of the computer system.

In the exemplary embodiment, 16 congruence classes have been grouped in partition 26. Since the entry size is 256 words for the exemplary cache, this yields a partition size that is 4096 words, which is the page size associated with the operating system of the exemplary embodiment. Partition 26 maps to more than one page in physical memory 28. Blocks 0, 64 and 128 are illustrated as mapping to partition 26 and other blocks at intervals of 64 pages in memory will likewise map to the partition. This creates a striping effect through memory. An N-way associative cache can support N pages mapped in this fashion without causing any of the values to be rolled out of the cache when other pages are requested.

So, for this example, 8 pages can be assigned from address regions corresponding to partition 26 without causing a page to roll out when another page is loaded.

In order to maintain critical blocks pinned in partition 26, the other blocks in excess of the associativity number that are mapped to partition 26 should be unused, or the loading of values from the other blocks may cause the values from the pinned block to be overwritten (victimized and flushed from the cache).

Figure 4:
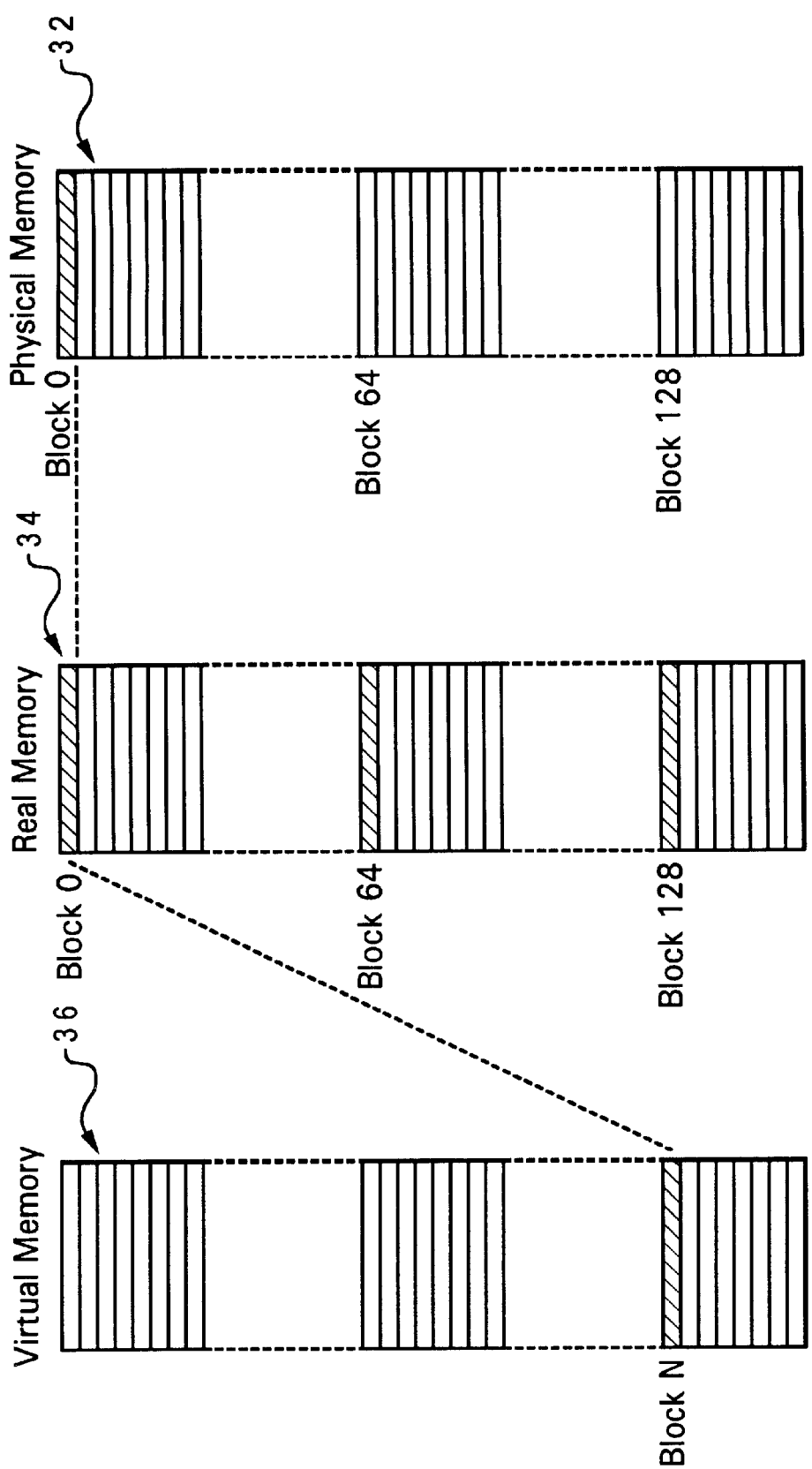
FIG. 4 is a pictoral diagram depicting the relationship between virtual, real and physical memory in accordance with an embodiment of the present invention.

In one embodiment of the invention, the above described relationship of congruence classes and real pages is used to maintain blocks pinned in cache. Referring to FIG. 4, a relationship of memory maps is demonstrated. To efficiently utilize memory, the ability to selectively map physical pages to real addresses provided in computers with memory banking controllers is used to advantage. By selectively placing physical memory pages at only N locations within a stripe associated with a given congruence class, where N is the associativity number, that congruence class can be associated exclusively with N pages in memory. As long as those pages remain pinned in memory, the cache will retain the values corresponding to those pages.

Although the ability to map physical pages out of regions where striping would cause potential undesired rollout from cache is advantageous, the option of leaving regions of memory unused will still produce the beneficial results of the present invention, albeit with some reduction in available physical memory.

There are other variations on this technique that will benefit other computer system uses. For example, groups of related applications or related subroutines from one application may be loaded into the cache partition, while another group from an unrelated application may be located in memory pages associated with the same partition so as to cause the values from the first group to roll out when the second group is loaded. This is a useful control when the first group of values is not needed at the same time as the second group of values. Controlling the rollout in this way improves over the quasi-random results that would have been obtained through traditional techniques.

Real memory map 34 shows the presence of blocks 0, 64, and 128 that are associated with partition 26 of the preferred embodiment. Physical memory map 32, shows that blocks 64 and 128 can be absent from the physical memory, eliminating the problem of unused pages that would occur in the operation of this embodiment.

Virtual memory map 36 shows how block 0 from the real memory map 34 can be located arbitrarily in virtual memory. This allows the operating system to assign memory pages in such a way that cache rollout can be prevented or encouraged by the above described techniques. In a virtual memory managed operating system, there is generally a much larger virtual address space than the real address space. Also, the real address space can often be larger than the physical memory installed. Pages in virtual memory can be mapped in any order and at any location to pages in real memory. By selecting an area in virtual memory in which to map the stripes of a partition, the partition's memory can be made contiguous or placed in areas where the operating system can easily keep track of the partition's values.

Referring again to FIG. 2, a second embodiment of the invention removes problems associated with striping and provides an alternative technique for preventing or encouraging cache rollout for particular application type of values. Within address 11, address field 13 that was used to select the congruence class in the prior example can be reduced to field 16. Address field 16 can then be used as a congruence class selector for the cache in combination with a group selector that replaces the bits that were supplied by the remaining bits of address field 13 in the previous embodiment. In order to access the values in cache, the group selector as well as the address must be known by the software or hardware accessing the cache.

The group selector acts in conjunction with load or store operations and may be supplied as an immediate bit field or value in an instruction sequence, may be supplied by a special purpose register in a processor, or by a general purpose register that is associated with a base register and whose contents are then passed to the cache when the base register is referenced. Alternatively other techniques commonly used in the art to produce address indexing might be used. It should be noted, however, that this group selector is not an address in that the selector can be arbitrary and does not correspond to a location in memory and it is used in conjunction with a portion of the address in order to access values in a particular congruence class.

This embodiment of the invention does not have the striping problem of the first embodiment. Here, the assignment of a unique group selector for a partition of one or more congruence classes prevents the overlapping regions due to the relationship of the address and the congruence class selector. The unique group selector provides a mechanism for avoiding a conflict, so the operating system or other mechanism can easily manage the pinning and releasing of blocks of memory in cache and can easily prevent or encourage rollout as described in association with the first embodiment. In addition, there is no restriction in the second embodiment with respect to the size of the memory blocks. Since the paging architecture is not being used to produce the relationship of memory to cache, the block sizes are not restricted to pages. In general, assignment of the same group selector to groups of values in excess of the associativity number of the cache will encourage rollout and assignment of different group selectors will prevent rollout.

Within an operating system, memory is generally managed in terms of heaps and page pools. By providing an operating system interface that can allow an application and the operating system itself to control memory allocation in the manner described by the invention, better control of the cache is achieved. The page manager may store the group selector within the information describing a memory block, the operating system or applications may initialize a number of heaps, where each heap is associated with a given group selector and therefore partition. This can allow the operating system or applications to effectively control rollout from the cache. The group selector can be embedded in the data structure describing the heap or associated with pointers allocated by heap allocation routines to allow the automatic loading of the group selector when referencing values on the heap. In this way, the special purpose register, general purpose register or immediate instructions described above can be used in conjunction with the virtual memory manager or a page manager to communicate the group selector to the cache.

While the above techniques apply to computer systems with cache memories, and specifically, to a processor system with cache memories, they are adaptable and contemplated to be useful in conjunction with other memory structures and other storage devices within a computer system. For example, the method might be used for partitioning caches in direct access storage devices, as well as the cache of the illustrative embodiments.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method for managing a cache memory in a computer system having at least one processor, said cache memory having a plurality of congruence classes each having a plurality of sets, comprising the steps of:

assigning a first partition comprising at least one congruence class with a particular application type of value to be accessed;

allocating memory for a first block of values having said particular application type of value at real address regions associated with said first partition;

mapping physical pages in memory such that physical memory is present for only a given number of a plurality of real address regions associated with said first partition;

receiving a request to access a plurality of values;

determining that said plurality of values matches said particular application type of value; and responsive to said determining step, accessing said set of values from a set within said first partition.

2. The method of claim 1, further comprising the step of allocating memory for a first block of values having said particular application type of value at physical address regions associated with said first partition.

3. The method of claim 2, further comprising the steps of second assigning a second partition comprising at least one congruence class with a second particular application type of value to be accessed; and second allocating memory for a second block of values having a second particular application type of value at a real address region corresponding to said at least one congruence class.

4. The method of claim 3, wherein said first block of values and said second block of values are requested by associated applications and said first and second allocating steps are performed so as to prevent said second block of values from causing said first block of values to be rolled out of said cache memory.

5. The method of claim 1, further comprising the step of allocating a virtual address in memory such that physical memory is present for only a given number of a plurality of real address regions associated with said first partition.

6. The method of claim 5, further comprising the steps of second assigning a second partition comprising at least one congruence class with a second particular application type of value to be accessed; and second allocating a second virtual address in memory for a second block of values having a second particular application type of value at an address corresponding to said second partition.

7. The method of claim 6, wherein said first block of values and said second block of values are requested by associated applications and said first and second allocating steps are performed so as to prevent said second block of values from causing said first block of values to be rolled out of said cache memory when said second block of values is loaded into said cache memory.

8. The method of claim 5, further comprising the steps of second assigning a second partition comprising at least one congruence class with a second particular application type of value to be accessed; and second allocating a second virtual address in memory for a second block of values having said particular application type of value at an address corresponding to said first partition.

9. The method of claim 8, wherein said first block of values and said second block of values are requested by unrelated applications and said first and second allocating steps are performed to allow said first block of values to be rolled out of said cache memory when said second block of values is loaded into said cache memory.

10. A computer system having at least one cache memory and processing means for executing program instructions comprising:

data storage means comprising a plurality of congruence classes containing a plurality of sets, wherein at least one congruence class is assigned to a first partition associated with a particular application type of value, allocated memory for blocks of values having said particular application type of value at real address regions associated with said first partition; and further mapped physical pages in memory such that physical memory is present for only a given number of a plurality of real address regions associated with said first partition; and cache controller means for controlling access to values stored within said data storage means, wherein said cache controller means accesses said values in said first partition only when said values match said particular application type of value.

11. The computer system of claim 10, wherein said program instructions allocate memory having said particular application type of value to physical address regions associated with said first partition.

12. The computer system of claim 11, wherein said data storage means is further partitioned into a second partition containing at least one congruence class, said second partition is associated with a second particular application type of value, and said program instructions further allocate memory for blocks of values having said second particular application type of value at real address regions associated with said second partition.

13. The computer system of claim 12, wherein said blocks of values having said particular application type of value and said blocks of values having said second particular application type of value are requested by associated applications by program instructions and said program instructions further allocate memory at real address regions associated with said first partition and said second partition to prevent said blocks of values having said particular application type of value from being rolled out of said data storage means when said blocks of values having said second particular application type of value are loaded into said data storage means.

14. The computer system of claim 11, wherein said program instructions allocate virtual addresses in memory such that physical memory is present for only a given number of a plurality of real address ranges associated with said first partition.

15. The computer system of claim 14, wherein said data storage means is further partitioned into a second partition containing at least one congruence class, said second partition is associated with a second particular application type of value, and said program instructions further allocate memory for blocks of values having said second particular application type of value at virtual address regions associated with said second partition.

16. The computer system of claim 15, wherein said blocks of values having said particular application type of value and said blocks of values having said second particular application type of value are requested by associated applications by program instructions and said program instructions further allocate memory at real address regions associated with said first partition and said second partition to prevent said blocks of values having said particular application type of value from being rolled out of said data storage means when said blocks of values having said second particular application type of value are loaded into said data storage means.

17. The computer system of claim 15, wherein said data storage means is further partitioned into a second partition containing at least one congruence class, said second partition is associated with a second particular application type of value, and said program instructions further allocate memory for blocks of values having said particular application type of value at virtual address regions associated with said second partition.

18. The computer system of claim 17, wherein said blocks of values having said particular application type of value are requested by unrelated applications by program instructions and said program instructions further allocate memory at real address regions associated with said first partition and said second partition to prevent said blocks of values having said particular application type of value from being rolled out of said data storage means when said blocks of values having said second particular application type of value are loaded into said data storage means.

* * * * *